United States Patent
Janakiraman et al.

(10) Patent No.: US 9,800,503 B2
(45) Date of Patent: Oct. 24, 2017

(54) CONTROL PLANE PROTECTION FOR VARIOUS TABLES USING STORM PREVENTION ENTRIES

(71) Applicant: Aruba Networks, Inc., Sunnyvale, CA (US)

(72) Inventors: Ramsundar Janakiraman, Sunnyvale, CA (US); Ravinder Verma, San Jose, CA (US); Brijesh Nambiar, Sunnyvale, CA (US); Rajesh Mirukula, Sunnyvale, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 276 days.

(21) Appl. No.: 13/918,770

(22) Filed: Jun. 14, 2013

(65) Prior Publication Data

US 2014/0156720 A1 Jun. 5, 2014

Related U.S. Application Data

(60) Provisional application No. 61/732,829, filed on Dec. 3, 2012.

(51) Int. Cl.
*H04L 12/803* (2013.01)
*H04L 29/06* (2006.01)
(Continued)

(52) U.S. Cl.
CPC .......... *H04L 47/122* (2013.01); *H04L 45/748* (2013.01); *H04L 47/11* (2013.01);
(Continued)

(58) Field of Classification Search
CPC ........ H04L 1/00–1/0002; H04L 1/0016; H04L 1/0019–1/0023; H04L 1/0027;
(Continued)

(56) References Cited

U.S. PATENT DOCUMENTS 6,118,760 A * 9/2000 Zaumen et al. ............... 370/229
6,118,765 A * 9/2000 Phillips ......................... 370/235
(Continued)

FOREIGN PATENT DOCUMENTS

WO 2011/019372 A2 2/2011

OTHER PUBLICATIONS

IP Address, Merriam-Webster Dictionary; Apr. 23, 2009.*
(Continued)

*Primary Examiner* — Tauqir Hussain
*Assistant Examiner* — Boris Grijalva Lobos
(74) *Attorney, Agent, or Firm* — Hewlett Packard Enterprise Patent Department (57) ABSTRACT

The present disclosure discloses a method and network device for control plane protection for various tables using storm prevention entries. Specifically, the disclosed system receives a first packet, and creates an inactive entry in a table. The system then forwards the first packet from a first processor to a second processor for processing. Also, the system associates the inactive entry with a timestamp indicating when the first packet is forwarded to the second processor, and determines a configured interval (CI) associated with the table. Further, the system compares a difference between a current timestamp and the timestamp associated with the inactive entry against the CI upon receiving a second packet. If the difference is longer than the CI, the system associates the inactive entry with the current timestamp, and forwards the second packet to the second processor for processing. Otherwise, the system discards the second packet.

18 Claims, 6 Drawing Sheets

(51) Int. Cl.
*H04L 12/801* (2013.01)
*H04L 12/745* (2013.01)
*H04L 12/841* (2013.01)

(52) U.S. Cl.
CPC .......... *H04L 47/28* (2013.01); *H04L 63/0272* (2013.01); *H04L 63/101* (2013.01); *H04L 63/20* (2013.01)

(58) Field of Classification Search
CPC ....... H04L 1/0036; H04L 41/00; H04L 41/06; H04L 41/0622; H04L 43/00; H04L 43/04; H04L 43/0823; H04L 43/0847; H04L 47/00–47/11; H04L 47/12–47/127; H04L 47/28–47/286; H04L 47/32–47/323; H04L 45/00; H04L 45/60; G06F 11/00–11/006; G06F 11/07; G06F 11/30; G06F 13/00; G06F 13/14; G06F 15/00; G06F 15/16; G06F 15/163; G06F 15/167; G06F 17/00
USPC ...... 712/1, 28, 29, 32, 220, 244; 714/100, 1, 714/48–51; 709/201–202, 223–225
See application file for complete search history.

(56) References Cited

U.S. PATENT DOCUMENTS

| | | | |
|---|---|---|---|
| 6,158,008 A * | 12/2000 | Maria et al. ................... 726/13 | |
| 6,167,045 A * | 12/2000 | Pirovano et al. ............. 370/389 | |
| 6,195,688 B1 * | 2/2001 | Caldwell ................ H04L 29/06 | 709/208 |
| 6,212,195 B1 * | 4/2001 | McCormack et al. ........ 370/419 | |
| 6,728,265 B1 | 4/2004 | Yavatkar et al. | |
| 7,624,263 B1 | 11/2009 | Viswanath et al. | |
| 7,626,934 B2 * | 12/2009 | Oouchi et al. ................ 370/235 | |
| 8,767,730 B2 * | 7/2014 | Ashwood-Smith ........... 370/389 | |
| 2002/0046271 A1 * | 4/2002 | Huang ........................... 709/223 | |
| 2003/0123462 A1 * | 7/2003 | Kusayanagi .................. 370/401 | |
| 2003/0231596 A1 * | 12/2003 | Hong ............................. 370/252 | |
| 2004/0093415 A1 * | 5/2004 | Thomas .............. H04L 67/1029 | 709/227 |
| 2004/0151117 A1 * | 8/2004 | Charcranoon ...... H04L 41/5003 | 370/235 |
| 2004/0170181 A1 * | 9/2004 | Bogdon .............. H04L 12/5692 | 370/400 |
| 2004/0189650 A1 * | 9/2004 | Deering ................ G06T 15/005 | 345/506 |
| 2004/0213237 A1 * | 10/2004 | Yasue .................. H04L 63/0227 | 370/392 |
| 2005/0053054 A1 * | 3/2005 | Das ........................ H04L 45/00 | 370/352 |
| 2005/0105524 A1 | 5/2005 | Stevens et al. | |
| 2005/0193429 A1 * | 9/2005 | Demopoulos et al. ......... 726/23 | |
| 2005/0198299 A1 * | 9/2005 | Beck et al. .................... 709/226 | |
| 2006/0047769 A1 * | 3/2006 | Davis et al. ................... 709/207 | |
| 2006/0294588 A1 * | 12/2006 | Lahann et al. .................. 726/23 | |
| 2007/0097875 A1 * | 5/2007 | Bender et al. ................ 370/252 | |
| 2008/0095167 A1 | 4/2008 | Bruss | |
| 2008/0141332 A1 * | 6/2008 | Treinen ............................. 726/1 | |
| 2009/0149189 A1 * | 6/2009 | Sammour et al. ............ 455/450 | |
| 2009/0150374 A1 * | 6/2009 | Dewey et al. .................... 707/5 | |
| 2010/0037311 A1 | 2/2010 | He et al. | |
| 2010/0172356 A1 | 7/2010 | Tavares et al. | |
| 2010/0329274 A1 * | 12/2010 | Romero et al. ............... 370/401 | |
| 2011/0023088 A1 * | 1/2011 | Ko et al. ........................... 726/3 | |
| 2011/0153862 A1 * | 6/2011 | Roosta et al. ................. 709/234 | |
| 2011/0292945 A1 | 12/2011 | Yasuda | |
| 2012/0057599 A1 | 3/2012 | Yong | |
| 2012/0207164 A1 * | 8/2012 | Tanaka .......................... 370/392 | |
| 2013/0246619 A1 | 9/2013 | Raja et al. | |
| 2013/0286846 A1 | 10/2013 | Atlas et al. | |
| 2013/0322444 A1 * | 12/2013 | Ossipov ........................ 370/392 | |

OTHER PUBLICATIONS

Non-Final Office Action in U.S. Appl. No. 13/918,748 dated Jan. 2, 2015. 13 pages.

Non-Final Office Action in U.S. Appl. No. 13/928,300 dated Nov. 5, 2014. 11 pages.

Non-Final Office Action in U.S. Appl. No. 13/692,622 dated Sep. 30, 2014. 5 pages.

* cited by examiner

CONTROL PLANE PROTECTION FOR VARIOUS TABLES USING STORM PREVENTION ENTRIES

RELATED APPLICATIONS

This application claims the benefit of priority on U.S. Provisional Patent Application 61/732,829, filed Dec. 3, 2012, the entire contents of which are incorporated by reference.

Related patent applications to the subject application include the following: (1) U.S. Patent Application entitled "System and Method for Achieving Enhanced Performance with Multiple Networking Central Processing Unit (CPU) Cores" by Janakiraman, et al., U.S. application Ser. No. 13/692,622, filed Dec. 3, 2012; (2) U.S. Patent Application entitled "Ingress Traffic Classification and Prioritization with Dynamic Load Balancing" by Janakiraman, et al., U.S. application Ser. No. 13/692,608, filed Dec. 3, 2012; (3) U.S. Patent Application entitled "Method and System for Maintaining Derived Data Sets" by Gopalasetty, et al., U.S. application Ser. No. 13/692,920, filed Dec. 3, 2012; (4) U.S. Patent Application entitled "System and Method for Message handling in a Network Device" by Palkar, et al., U.S. application Ser. No. 13/918,732, filed Jun. 14, 2013; (5) U.S. Patent Application entitled "Session-Based Forwarding" by Janakiraman, et al., U.S. application Ser. No. 13/918,748, filed Jun. 14, 2013; (6) U.S. Patent Application entitled "Rate Limiting Mechanism Based on Device Load/Capacity or Traffic Content" by Nambiar, et al., U.S. application Ser. No. 13/918,760, filed Jun. 14, 2013. The entire contents of the above applications are incorporated herein by reference.

FIELD

The present disclosure relates to networking processing performance of a symmetric multiprocessing (SMP) network architecture. In particular, the present disclosure relates to a system and method for providing control plane protection for various tables using storm prevention entries.

BACKGROUND

A symmetric multiprocessing (SMP) architecture generally is a multiprocessor computer architecture where two or more identical processors can connect to a single shared main memory. In the case of multi-core processors, the SMP architecture can apply to the CPU cores.

In an SMP architecture, multiple networking CPUs or CPU cores can receive and transmit network traffic. Generally, multiple CPU cores are fastpath processors that perform "fast" network processing operations. The fastpath processors do not block themselves and wait for other components or modules during the processing of network packets. Whenever an exception occurs in a fastpath CPU processor, the exception is passed onto a slowpath processor for further handling in order to ensure the processing speed of the fastpath processors. Moreover, whenever an exception occurs in a slowpath CPU processor, the exception is typically passed onto control plane processor for further handling.

On a highly scalable platform, it is possible that a large volume of exceptions get passed from fastpath processors to the slowpath processor, and further to the control plane processor. This may lead to a number of problems. First, the control plane processor may slow down its processing speed when it is burdened with a large volume of exception handlings, which may eventually lead to non-convergence of the operations. Specifically, when the control plane processor slows down at processing the exceptions, more exceptions will be accepted into the processing queue. Then, more and more of the accepted exceptions will not be able to get processed before they time out. Thus, the same request would need to be started over again from the fastpath processors.

Second, because the operations take longer in the scenario where there are a large volume of exceptions that need to be handled by the system, redundant exceptions may occur for the same use case. For example, assuming that an exception occurred due to a user miss (for example, when there is no corresponding authenticated user entry recognized by the system) while processing a layer 3 (L3) packet, the layer 3 packet will be passed to control plane for further processing, e.g., to trigger a user authentication operation. The user authentication operation from the control plane processor may require sending a retry authentication request packet. Normally, when the user is authenticated as a result of successful user authentication operation, a user entry may be cached by the system in a shared memory. Thus, subsequent L3 packets would not encounter the same user miss.

Nevertheless, as the volume of exceptions increase, because the system takes a longer processing time with higher volume, the control plane processor may need to send multiple retry authentication requests for the same L3 packet. These multiple retry authentication requests will create exactly the same exceptions at the fastpath processors, which will be passed on to slowpath processor and further to the control plane processor, because the system had not successfully completed the user authentication operation and cached the corresponding user entry. Thus, the longer it takes for the control plane processor to complete an operation, the more likely for the control plane processor to receive the same exceptions over and over due to prior delayed or unsuccessful completion of the corresponding operation. Thus, the slow processing time with a high volume of exception handling requests is exacerbated by the additional load of the same exceptions generated from retry packets because of the initial slow processing time.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to SMP architecture performance enhancement, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to networking processing performance. In particular, the present disclosure relates to a system and method for control plane protection for various tables using storm prevention entries. Specifically, the system achieves control plane protection for various tables by introducing inactive entries in various tables to prevent additional misses to cause exception flooding to the control plane.

According to embodiments of the present disclosure, an inactive entry is created in the absence of an entry in a table corresponding to a packet, and subsequent packets corresponding to the same entry will be discarded upon detection of the inactive entry in the table. Specifically, with the solution provided herein, a disclosed network device receives a first packet by a first processor, and creates an inactive entry based on a source Internet Protocol (IP) address associated with the first packet. The first processor of the disclosed network device then forwards the first packet to a second processor for processing. Furthermore, one of a plurality of processors will discard a second packet associated with the same source IP address upon detection of the inactive entry when the second packet is received. In addition, the disclosed system can also detect inactive entries in indirect dependent tables. For example, a lookup failure in session table can trigger the disclosed system to lookup user table for inactive user entry following the same scheme as described herein.

In some embodiments, the disclosed network device associates the inactive entry with a timestamp indicating when the first packet is forwarded to the second processor by the first processor.

In some embodiments, the disclosed network device compares a current timestamp with the timestamp associated with the inactive entry upon receiving the second packet. If the difference is longer than a configured interval (CI), the disclosed network device associates the inactive entry with the current timestamp and forwards the second packet to the second processor for processing. On the other hand, if the difference is not longer than the CI, the disclosed network device will discard the second packet.

In some embodiments, the disclosed network device determines a configured interval (CI) for each type of tables maintained by the network device to facilitate packet processing. The CI can be determined based on one or more of a packet type, an amount of time a respective processor takes to processing the first packet, and a relative frequency at which the same type of packets are received.

Also, the inactive entry may be created in a port table, a route table, a virtual local area network (VLAN) table, a route cache, a bridge table, a session policy table, a station table, and/or a user table.

In some embodiments, the first processor comprises an exception handling processor; the second processor comprises a control plane processor; the plurality of processors comprises a plurality of forwarding processors; and the first processor and the plurality of processors share access to a memory of the network device.

In some embodiments, the inactive entry is created in response to a missing entry in a first table. Further, the disclosed network device determines whether a second entry corresponding to the first packet exists in at least a second table, whereas a first table having a missing entry is dependent upon the second table. If the second entry existing in the second table, the disclosed network device creates a first entry in the first table for the first packet based on the second entry. In some embodiments, the first table comprises a session table that does not allow for inactive entry; and, the second table comprises a user table.

General Architecture

Figure 1:
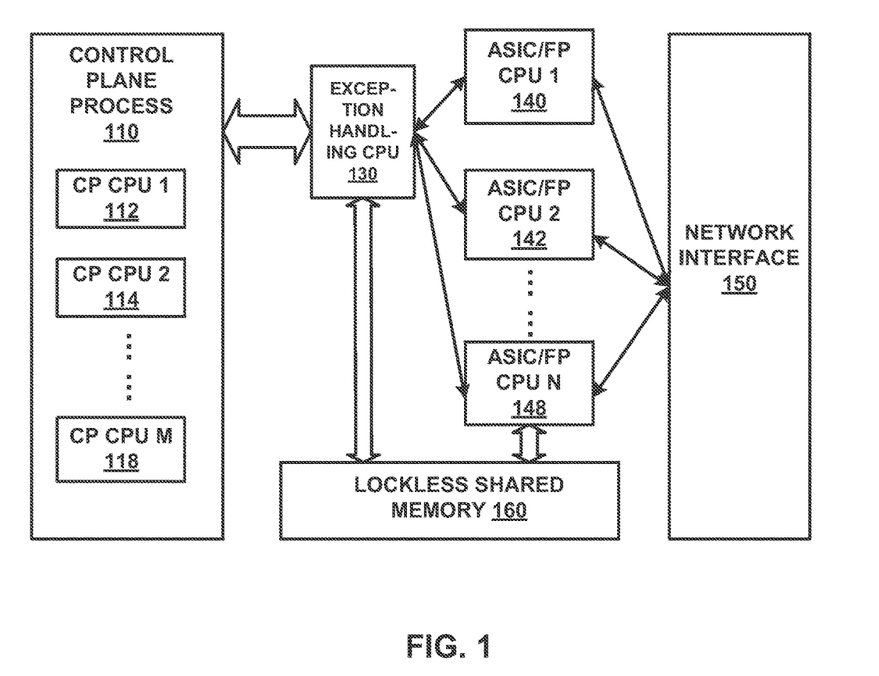
FIG. 1 illustrates an exemplary architecture at multiple processing planes according to embodiments of the present disclosure.

FIG. 1 illustrates a general architecture including multiple processing planes according to embodiments of the present disclosure. The disclosed system includes a plurality of control plane processors (e.g., CP CPU1, CP CPU2, CP CPU3, . . . CP CPU M) and a plurality of datapath processors, which include a slowpath (SP) or exception handling processor (e.g., SP CPU) and multiple fastpath (FP) or forwarding processors (e.g., FP CPU 1, FP CPU 2 . . . FP CPU N). In some embodiments, the FP processors can be replaced by multiple ASICs. The SP or exception handling processor can be a part of data plane processors or a separate CPU complex. Further, the SP or exception handling processor has the ability to program tables that are readable by the FP processors or ASICs. The disclosed system also includes a lockless shared memory that can be accessed by all datapath processors in the system.

Specifically, FIG. 1 includes at least a control plane process 110, two or more datapath processors 120, a lockless shared memory 160 accessible by the two or more datapath processors 120, and a network interface 150.

Control plane process 210 may be running on one or more CPU or CPU cores, such as CP CPU 1 112, CP CPU 2 114, . . . CP CPU M 118. Furthermore, control plane process 110 typically handles network control or management traffic generated by and/or terminated at network devices as opposed to data traffic generated and/or terminated at client devices.

According to embodiments of the present disclosure, datapath processors 120 include a single exception handling CPU 130, such as a slowpath (SP) processor and multiple fastpath (FP) processors or ASICs (e.g., ASIC/FP CPU 1 140, ASIC/FP CPU 2 142, . . . ASIC/FP CPU N 148). Only ASIC/FP processors are able to receive data packets directly from network interface 150. Exception handling processor, on the other hand, only receives data packets from ASIC/FP processors.

Lockless shared memory 160 is a flat structure that is shared by all datapath processors 120, and not tied to any particular CPU or CPUs. Any datapath processor can read any memory location within lockless shared memory 160. Therefore, both the single exception handling processor 130 and the multiple ASIC/FP processors (e.g., ASIC/FP CPU 1 140, ASIC/FP CPU 2 142, . . . ASIC/FP CPU N 148) have read access to lockless shared memory 160, but, besides write access to update timestamps by the multiple ASIC/FP processors, only the single exception handling processor 130 has write access to lockless shared memory 160. More specifically, any datapath processor can have access to any location in lockless shared memory 160 in the disclosed system.

Also, control plane process 110 is communicatively coupled to exception handling CPU 130, but not ASIC or fastpath (FP) processors (e.g., ASIC/FP CPU 1 140, ASIC/FP CPU 2 142, ... ASIC/FP CPU N 148). Thus, whenever control plane process 110 needs information from datapath processors 120, control plane process 110 will communicate with exception handling processor 130.

Network Forwarding Pipeline Process

Figure 2:
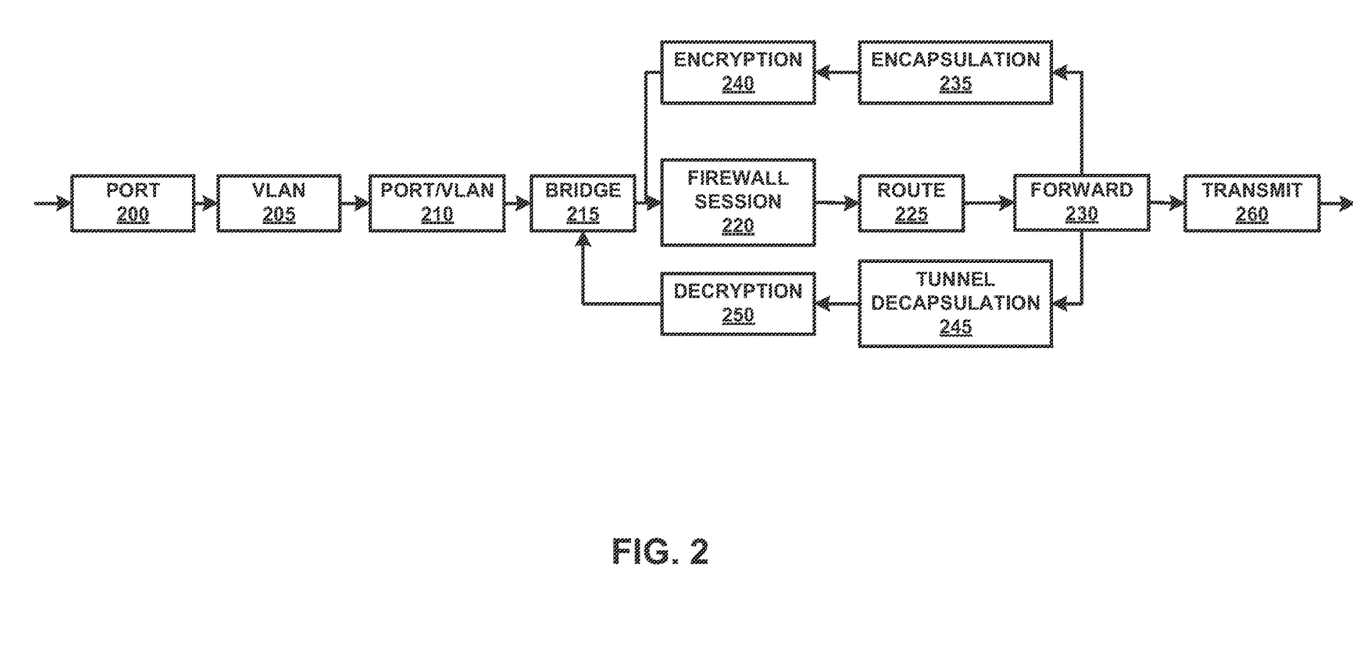
FIG. 2 illustrates an exemplary network forwarding process according to embodiments of the present disclosure.

FIG. 2 illustrates an exemplary network forwarding pipeline process according to embodiments of the present disclosure. A typical network forwarding pipeline process at a FP processor involves one or more of the following operations:

Port lookup;
VLAN lookup;
Port-VLAN table lookup;
Bridge table lookup;
Firewall session table lookup;
Route table lookup;
Packet encapsulation;
Packet encryption;
Packet decryption;
Tunnel de-capsulation; and/or
Forwarding; etc.

In a typical FP processor's pipeline process as illustrated in FIG. 2, for each ingress packet, the packet will pass through one or more of the following processing steps: a port lookup, a VLAN lookup, a port/VLAN lookup, a bridge lookup, a firewall session lookup, a route table or route cache lookup, forwarding table lookup, etc. In some embodiments, before the packet is transmitted, the packet will go through encapsulation and/or encryption process. If it's a L2 packet, the packet will go through bridge table lookup after encryption and continue with the process flow. On the other hand, if it's a L3 packet, the packet will go through firewall session lookup and continue with the process flow. In some embodiments, for example when an ingress packet is received via a GRE tunnel, the packet will go through a tunnel de-capsulation and/or decryption process. If it's a L2 packet, the packet will go through bridge table lookup after encryption and continue with the process flow. Note that, the L2 packets will be going through steps such as firewall session processing because the disclosed system is capable of performing L3/L4 policy enforcement, Deep Packet Inspection (DPI), etc., for even L2 bridge traffic.

Thus, the network forwarding process illustrated in FIG. 2 includes at least a port lookup operation 200, a virtual local area network (VLAN) lookup operation 205, a port/VLAN lookup operation 210, a bridge lookup operation 215, a firewall session lookup operation 220, a route lookup operation 225, a forward lookup operation 230, an encapsulation operation 235, an encryption operation 240, a tunnel de-capsulation operation 245, a decryption operation 250, and a transmit operation 260.

Figure 3:
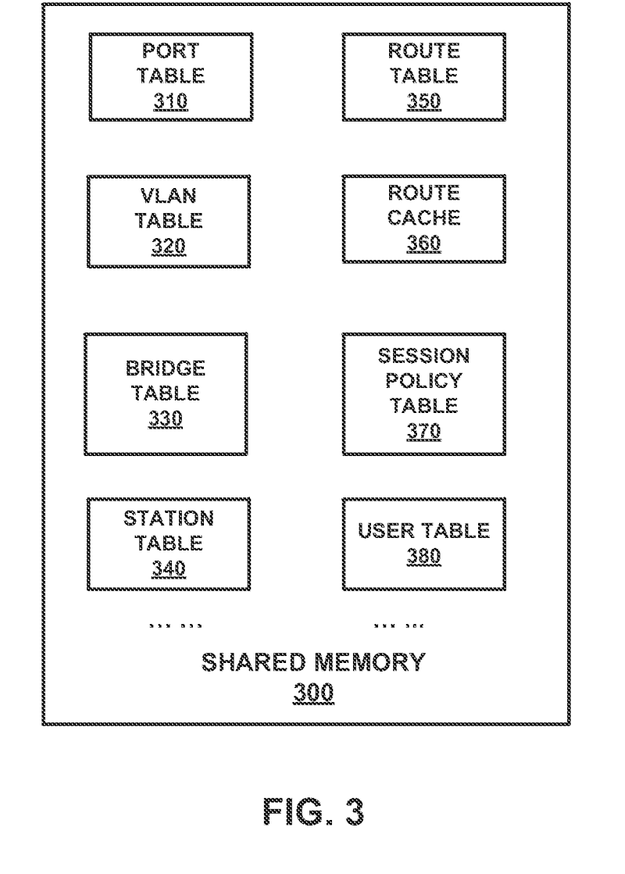
FIG. 3 is a diagram illustrating exemplary routing tables maintained in a shared memory according to embodiments of the present disclosure.

During the above pipeline process, the FP processors will have to perform lookups in a number of different tables as shown in FIG. 3. A shared memory can be used to store a variety of above-mentioned tables to assist software network packet forwarding. For example, the tables may include, but are not limited to, a bridge table, a session table, a user table, a station table, a tunnel table, a route table and/or route cache, etc. Specifically, in the example illustrated in FIG. 3, shared memory 300 stores at least one or more of a port table 310, a VLAN table 320, a bridge table 330, a station table 340, a route table 350, a route cache 360, a session policy table 370, a user table 380, etc. Each table is used during network forwarding operations illustrated in FIG. 2 for retrieving relevant information in order to perform proper network forwarding. For example, port table 310 is used during port lookup operation to look up a port identifier based on the destination address of a network packet. Likewise, VLAN table 320 is used during VLAN lookup operation to look up a VLAN identifier based on the port identifier and/or source/destination address(es). Note that, a table can be used by multiple network forwarding operations, and each network forwarding operation may need to access multiple routing tables.

In some embodiments, shared memory 300 is a lockless shared memory. Thus, multiple tables in shared memory 300 can be accessed by multiple FP processors while the FP processors are processing packets received one or more network interfaces. If the FP processor determines that a packet requires any special handlings, the FP processor will hand over the packet processing to the SP processor. For example, the FP processor may find a table entry corresponding to the packet is missed; and therefore, handing over the packet processing to the SP processor. As another example, the FP processor may find that the packet is a fragmented packet, and thus hand over the packet processing to the SP processor.

Control Plane Protection for Various Tables

When a table entry is missed during a table lookup operation or if the result from the table lookup operation requires special handling or causes an exception, the process will be handed over from FP processors to the SP processor.

In an exemplary use case scenario, a user tries to access a portal website (e.g., http://www.yahoo.com), which may contain a large number of embedded links to other websites. In order to present the embedded links to the user, a separate session flow would be created for each of the embedded website. When multiple users try to connect to such portal website, there will likely be a lot ingress packets associated with unauthenticated users flooding to the FP and/or SP processors.

When the SP processor receives the first packet from an unauthenticated user, the SP processor will forward the packet to control plane processors for authentication and create an inactive entry in the user table. Until the control plane processor completes the user authentication processor, all subsequent packets from the same unauthenticated user at the datapath processors will be dropped upon detection of the inactive entry associated with the user in the user table.

In a high throughput use case scenario, when, for example, ingress packets associated with more than 1,000 unauthenticated users are received at or around the same time, the system may not be able to handle all of the packets. Thus, it is possible that some of the 1,000 users' authentication packet requests will be dropped by the datapath (DP) processors instead of being forwarded to the control plane process in high throughput networking environment.

Furthermore, the control plane processors often maintain one or more socket queues, from which a user gets packet output. However, the socket queue from the slowpath processor to the control plane processors may overflow in the above-described flooding events. Hence, the first packet may be dropped due to the socket queue overflow. Thus, it is possible that an inactive entry is created in the user table while processing the first packet which gets dropped due to socket queue overflow. In addition, all subsequent packets get dropped too due to the detection of the inactive entry in the user table. Therefore, the operation may never be completed.

The disclosed system allows for FP processor to detect a pending authentication process via an inactive entry in a table without flooding the packets from a user whose authentication is pending to the SP processor to slow down the system's performance. Meanwhile, the disclosed system also associates a timestamp with the inactive entry, such that in case a first packet gets dropped due to events like socket queue overflow, a subsequent packet may be processed after the inactive entry times out.

Figure 4:
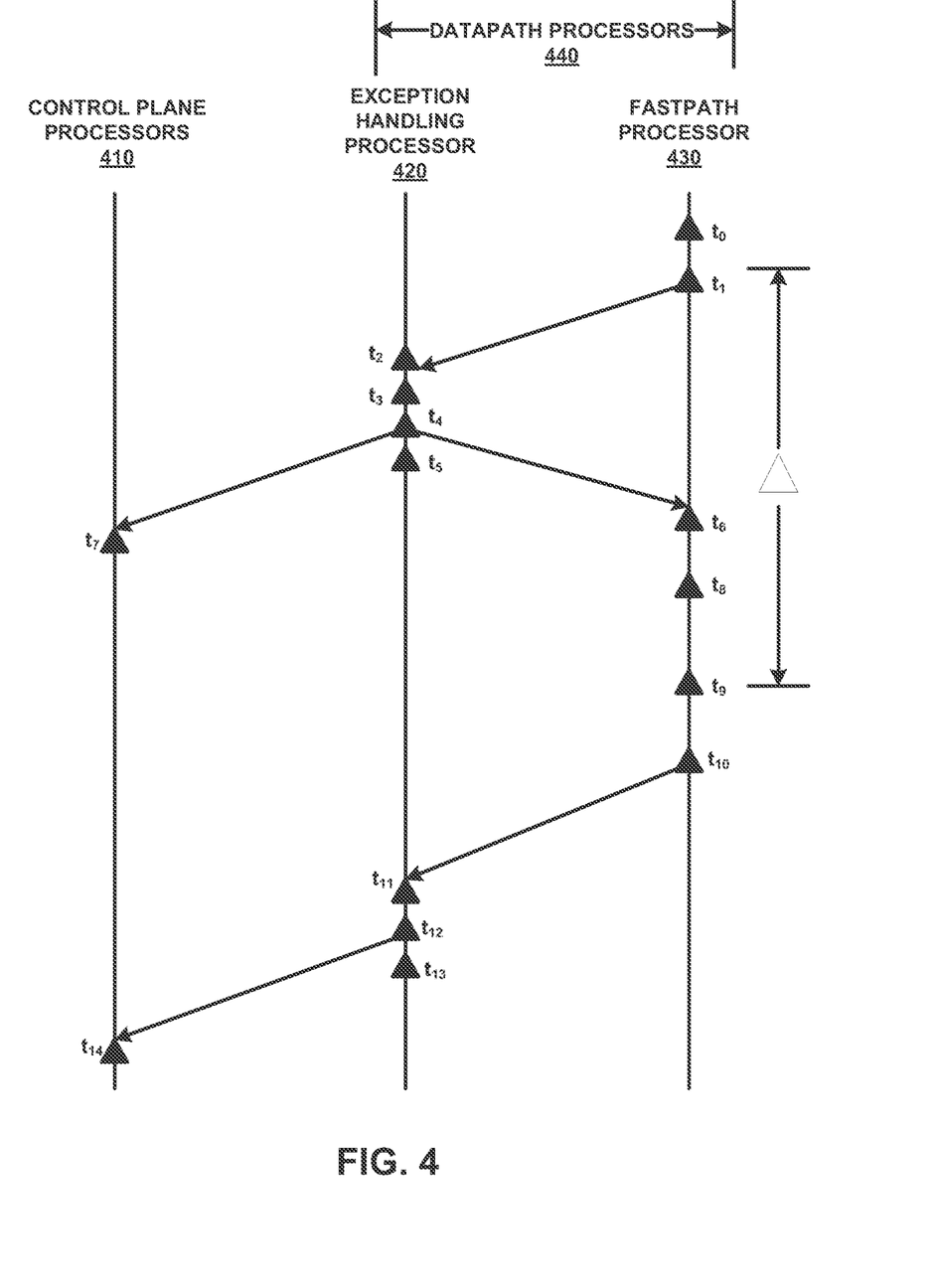
FIG. 4 is a sequence diagram illustrating an exemplary control plane protection mechanism for various tables using storm prevention entries according to embodiments of the present disclosure.

FIG. 4 illustrates an exemplary control plane protection mechanism for various tables using storm prevention entries according to embodiments of the present disclosure. Specifically, the exemplary control plane protection mechanism includes communications between datapath processors 440 and control plane processors 410. Moreover, in some embodiments, datapath processors 440 may include fastpath (FP) processors 430 and exception handling processor 420 as shown in FIG. 4. In other embodiments, exception processor 420 can be separate CPU complex that is not a part of datapath processors 440 (not shown).

At time $t_0$, fastpath (FP) processor receives a packet. Assuming that the processing of the packet by an FP processor reveals a table miss, e.g., a miss in the user table. Generally, FP processor 430 forwards the packet to exception handling processor 420 whenever there is a table miss or a packet requires special handling. Thus, at time $t_1$, FP processor 430 forwards the packet to exception handling processor 420, which receives the packet at time $t_2$. At time $t_3$, exception handling processor 420 creates an inactive entry in the table with the missing entry whenever possible, e.g., exception handling processor 420 can create an inactive user entry in the user table. Exception handling processor 420 will then send the packet to control plane processors 410 at time $t_4$. The entry is marked as "inactive" because it will not be used in forwarding by datapath processors 440.

Furthermore, exception handling processor 420 also associates a timestamp $t_4$ with the inactive table entry. Specifically, the timestamp indicates when the packet was last forwarded to control plane processors 410. Thus, the timestamp is a configured interval (CI) for each type of the tables. The CI is determined based on factors, such as the packet type, the amount of time it takes exception handling processor 420 to complete the exception processing, etc. For example, if the type of exception requires longer processing time, the CI may be configured at a relatively long interval time period correspondingly. As another example, if the trigger of the exception is a very high frequency type of packet, the CI may be configured at a relatively short interval time period.

Note that, FP processors 430 generally represent any forwarding CPU or forwarding application-specific integrated circuit (ASIC). On the other hand, exception handling processor 420 generally represents a first level exception processing unit that also manages various tables, as well as inactive entries in such tables. Once exception handling processor 420 creates an inactive entry in the table that triggers the dropping of all subsequent packets, the dropping of the packets can be performed by any ASIC or FP processor 430 before any such packets get forwarded to exception handling processor 420 from ASIC or FP processor 430. Therefore, the exceptions will be stopped at the earliest processing point in the system, e.g., as soon as ASIC or FP processor 430 receives the packet and detects an inactive entry.

Specifically, when there is a subsequent miss on the same table, e.g., at time $t_8$ or $t_9$, ASIC or FP processor 430 will perform a lookup in the table, which will find the inactive entry. Then, ASIC or FP processor 430 compares its current time value with the timestamp of the inactive entry. If the difference between ASIC or FP processor 430's current time value and the timestamp value of the inactive entry is less than a predetermined threshold time interval $\Delta$, ASIC or FP processor 430 will drop the packet, because the difference being less than the threshold $\Delta$ implies that there has been a recent request already sent to control plane processors 410.

On the other hand, if the difference between ASIC or FP processor 430's current time value and the timestamp value of the inactive entry is greater than a predetermined threshold time interval $\Delta$ (for example, when a subsequent data packet from the same user arrives at time $t_{10}$), ASIC or FP processor 430 will forward the packet to exception handling processor 420, which receives the packet at time $t_{11}$ and will in turn forward the packet to control plane processors 410 for further processing (e.g., authentication) at time $t_{12}$. This is because when the difference in time interval exceeds a predetermined threshold $\Delta$, it is assumed that the previous packet sent to control plane processors 410 may not have been delivered or processed properly. The predetermined threshold value $\Delta$ can be determined based on what a reasonable expected time period would be for control plane processors 410 to complete the processing. In other words, datapath processors 440 (which may include, for example, ASIC or FP processor 430 and exception processor processor 420) only forward exceptions if the configured interval has elapsed from when it sent the last exception.

It is important to note that, the subsequent ingress data packets from the same user may be coming from different data flows and be processed by different ASICs or FP processors 430. However, any datapath processor 440 can access any table in the shared memory. Thus, each of ASICs or FP processors 430 will come to find the inactive table entry in the same manner. Moreover, ASIC or FP processor 430 updates the timestamp value when it forwards the packet to exception handling processor 420, e.g., at time $t_{10}$. Even if multiple ASICs or FP processors 430 update the timestamp at the same time, the timestamp may be updated multiple times close in time, which will not significantly affect the result. When exception handling processor 420 receives a packet from ASIC or FP processor 430 and finds that there is an inactive table entry corresponding to the packet, exception handling processor 420 will always forward the packet. The same logic can be applied to update MAC address in a route table, and any other table in the shared memory.

Control Plane Protection for Dependent Tables

In some embodiments, at time $t_0$, if a session table entry is missed, the disclosed system will handle the table miss slightly differently, because all entries in the session table shall correspond to an active session. Thus, there cannot be any inactive session entries inserted into the session table. Moreover, the session table has substantial dependencies upon the user table. Any changes in the user or user policy may affect session table entries. In a high throughput and high performance system, updating session table can incur substantial cost if not done properly.

When a session entry is missed from the session table, there are two possibilities: First, it may be a new user that hasn't been authenticated; second, it might be a known user (i.e., a user having a corresponding user entry in the user table) but the packet belongs to a new flow.

The SP processor will first perform a lookup in the user table to determine whether the received packet corresponds to a known user, for example, by determining whether a user entry exists corresponding to the source IP address. If so, the packet is considered as corresponding to a known user, but being received as a part of a new flow. In such cases, the SP processor will create a new session entry in the forwarding table, and hand over the packet to the FP processor to continue the pipeline process.

For example, an IP address "10.1.1.1" may be associated with a guest user (that is, a user assigned as a role of "guest"). The guest user policy may be set in a session ACL table as the following:

| | | |
|---|---|---|
| user | corp-subnet | drop |
| user | any | allow |

A session ACL table is typically used to set out rules for what is allowed and what is not allowed for a user.

Furthermore, an entry in the session table may include at least a 5-tuple (e.g., {src IP, dest IP, src port, dest port, protocol}) and a policy (e.g., permitted or denied). The session table maintains the user policy rules on a per-flow basis; and thus, avoids multi-step complicated lookup for the permission information when a packet associated with a particular user and/or flow is received.

On the other hand, if the user is unknown (e.g., there is no user entry in the user table), the user needs to be properly authenticated by the control plane processor. In such cases, the SP processor will hand over the packet processing to the control plane processors, and initiate an authentication process for the user.

At an abstract level, different roles are defined for various users, which determine what a particular user can or cannot access. Each role is attached to one or more access policies. Each user is assigned to one or more roles, e.g., an employee role versus a guest role. The roles and policies are not visible to the datapath and are only processed by control plane processors. A policy attached to a role will be imposed to any user assigned to the role. Each session corresponds to the user will be applied the same policy. However, because the sessions are specific to each flow, the total number of sessions far exceeds the number of users and/or roles.

When a session is created, a user index is stored. Periodically, a process (which can also be used for session aging determinations) iterates through the session table to determine whether the policy version number has changed since last time of iteration based on the user index. The version number is assigned to each policy to facilitate the determination of whether a policy has changed. Every time a policy changes, the policy version number is updated accordingly. If the process determines that the policy version number has changed, an action will be taken on the session, e.g., deleting the session entry, updating the session entry, or modifying the session entry.

In general, when multiple layers of table dependencies exist (e.g., table A depends on table B, which depends on table C, which depends on table D), a CPU processor can check in each table at each level to determine whether the corresponding entry exists before the CPU processor proceeds to process the packet. Likewise, when a table has multiple dependencies (e.g., table A depends on tables B, C, and D), a CPU processor can check to determine whether the corresponding entry in each table (that the table with an entry miss is dependent upon) exists before the CPU processor proceeds to process the packet.

Figure 5:
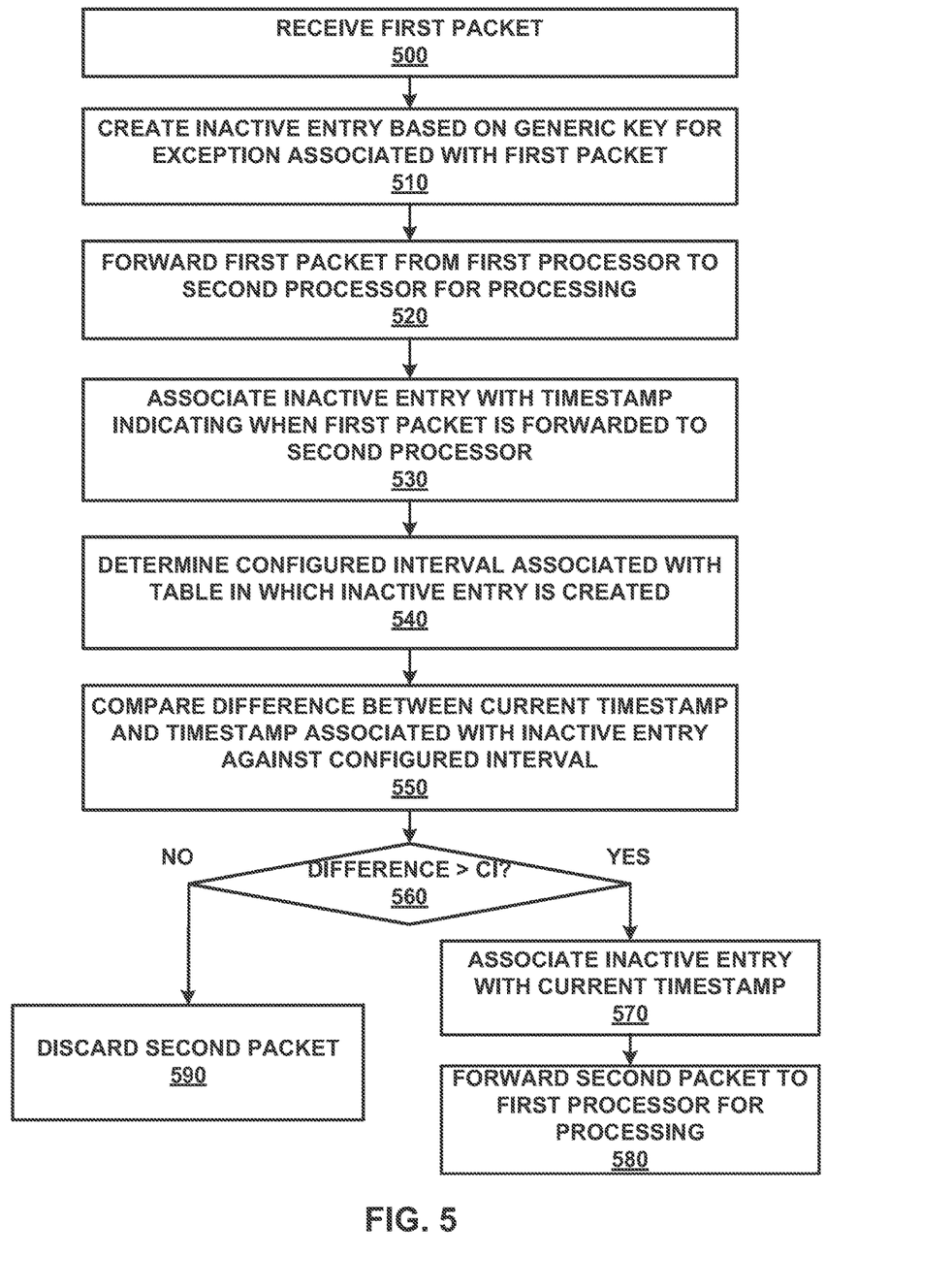
FIG. 5 illustrates an exemplary process for control plane protection mechanism for various tables using storm prevention entries according to embodiments of the present disclosure.

Processes for Control Plane Protection for Various Tables Using Storm Prevention Entries FIG. 5 is a flowchart illustrating exemplary processes for control plane protection for various tables using storm prevention entries. During operation, the disclosed system receives a first packet (operation 500). Then, the disclosed system creates an inactive entry based on a generic key for exception associated with the first packet (e.g., thrown while processing the first packet) (operation 510), and forwards the first packet from a first processor to a second processor for processing (operation 520).

Note that, in some embodiments, when the system uses ARP handling and L3 authentication, the generic key can be based on the source IP address of the packet. In other embodiments, when the system uses L2 user authentication and detect bridge lookup misses, the generic key can be based on the source MAC address of the packet instead.

Also, the disclosed system can work well even when all control plane processors are separated from exception handling processor and/or ASIC/FP CPUs. In some embodiments, the exception handling processor can be a part of datapath processors. In other embodiments, the exception handling processor can be a separate CPU complex with programmability of the ASIC/FP CPU tables. For example, when using inline programming, e.g., using the same interface for packet and programming messages, the ASIC or FP CPUs can be connected to the exception handling processor through a network interface through one or more hops.

Furthermore, the disclosed system associates the inactive entry with a timestamp indicating when the first packet is forwarded to the second processor (operation 530).

Note that, in the disclosed system, the first processor may generally include an exception handling processor. The second processor may generally include a control plane processor. The disclosed system may further include a plurality of forwarding processors. In addition, the first processor and the plurality of processors can share access to a memory of the disclosed system.

Also, the disclosed system determines a configured interval (CI) associated with a table in which the inactive entry is created (operation 540). Note that, the inactive entry can be created in one or more tables, such as, a port table, a route table, a virtual local area network (VLAN) table, a route cache, a bridge table, a session policy table, a station table, a user table, etc. In some embodiments, the disclosed system determines a configured interval for each type of tables maintained by the system to facilitate packet processing. Furthermore, the CI may be determined based on one or more factors, such as a packet type, an amount of time a respective processor takes to processing the first packet, a relative frequency at which the same type of packets are received, etc.

Next, the disclosed system compares a difference between a current timestamp and the timestamp associated with the inactive entry against the configured interval in response to receiving a second packet associated with the source IP address (operation 550). The disclosed system then determines whether the difference in timestamps is longer than the configured interval (operation 560). If the difference is longer than the configured interval, the disclosed system associates the inactive entry with the current timestamp (operation 570), and forwards the second packet to the first processor for processing (operation 580). On the other hand, if the difference is no longer than the configured interval, the disclosed system will discard the second packet (operation 590).

In some embodiments, the inactive entry is created when there is a missing entry in a first table. Accordingly, the disclosed system can determine whether a second entry corresponding to the first packet exists in at least a second table, whereas the first table having the missing entry is dependent upon the second table. If the second entry exists in the second table, the disclosed system will create a first entry in the first table for the first packet based on the second entry. In one embodiment, the first table includes a session table that does not allow for inactive entry, and the second table includes a user table. In addition, the same scheme can be extended to multiple additional levels of indirect dependent tables.

Figure 6:
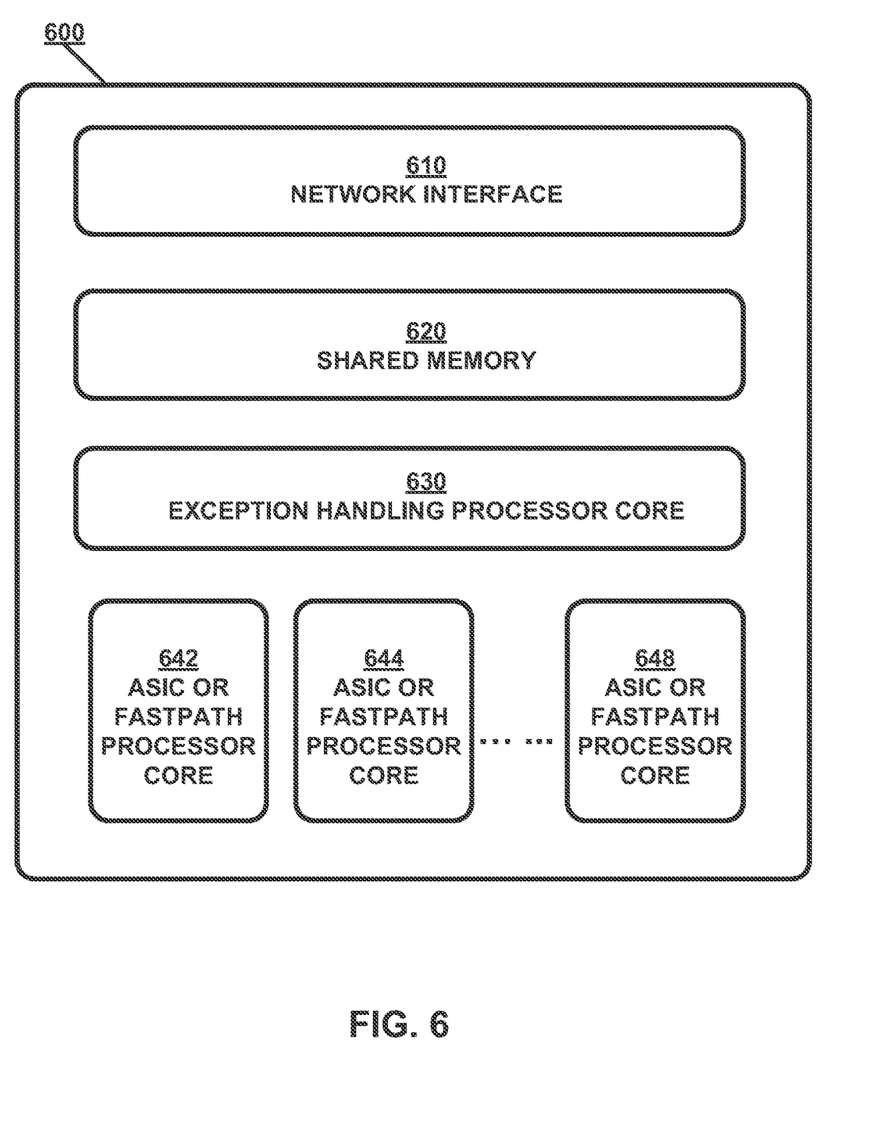
FIG. 6 is a block diagram illustrating a system of control plane protection mechanism for various tables using storm prevention entries according to embodiments of the present disclosure.

System for Control Plane Protection for Various Tables Using Storm Prevention Entries FIG. 6 is a block diagram illustrating a network device system control plane protection for various tables using storm prevention entries according to embodiments of the present disclosure. Network device 600 includes at least a network interface 610 capable of communicating to a wired network, a shared memory 620 capable of storing data, an exception processor core 630 capable of processing network data packets, and one or more ASICs or fastpath processor cores, including ASIC/fastpath processor core 642, ASIC/fastpath processor core 644, . . . , ASIC/fastpath processor core 648, which are capable of processing network data packets. Moreover, network device 600 may be used as a network switch, network router, network controller, network server, etc. Further network device 600 may serve as a node in a distributed or a cloud computing environment.

Network interface 610 can be any communication interface, which includes but is not limited to, a modem, token ring interface, Ethernet interface, wireless IEEE 802.11 interface (e.g., IEEE 802.11n, IEEE 802.11 ac, etc.), cellular wireless interface, satellite transmission interface, or any other interface for coupling network devices. In some embodiments, network interface 610 may be software-defined and programmable, for example, via an Application Programming Interface (API), and thus allowing for remote control of the network device 600.

Shared memory 620 can include storage components, such as, Dynamic Random Access Memory (DRAM), Static Random Access Memory (SRAM), etc. In some embodiments, shared memory 620 is a flat structure that is shared by all datapath processors (including, e.g., exception handling processor core 630, ASIC/fastpath processor core 642, ASIC/fastpath processor core 644, . . . , ASIC/fastpath processor core 648, etc.), and not tied to any particular CPU or CPU cores. Any datapath processor can read any memory location within shared memory 620. Shared memory 620 can be used to store various tables to facilitate control plane protection for the various tables using storm prevention entries. For example, the tables may include, but are not limited to, a bridge table, a session table, a user table, a station table, a tunnel table, a route table and/or route cache, etc. It is important to note that there is no locking mechanism associated with shared memory 620. Any datapath processor can have access to any location in lockless shared memory in network device 600. Exception handling processor core 630 has the ability to program tables accessible by multiple ASICs or FP CPU cores.

Exception handling processor core 630 typically includes a networking processor core that is capable of processing network data traffic. Exception handling processor core 630 is a single dedicated CPU core that typically handles table managements. Note that, exception handling processor core 630 only receives data packets from one or more ASICs or fastpath processor cores, such as ASIC/fastpath processor core 642, ASIC/fastpath processor core 644, . . . , ASIC/fastpath processor core 648. In other words, exception handling processor core 630 does not receive data packets directly from any line cards or network interfaces. Only the plurality of ASICs or fastpath processor cores can send data packets to exception handling processor core 630. Moreover, besides write access for updating timestamps by the ASICs or FP CPUs, exception handling processor core 630 is the only processor core having the write access to shared memory 620, and thereby will not cause any data integrity issues even without a locking mechanism in place for shared memory 620.

ASCIs or fastpath processor cores 642-648 also include networking processor cores that are capable of processing network data traffic. However, by definition, ASCI/fastpath processor cores 642-648 only performs "fast" packet processing. Thus, ASIC/fastpath processor cores 642-648 do not block themselves and wait for other components or modules during the processing of network packets. Any packets requiring special handling or wait by a processor core will be handed over by ASICs or fastpath processor cores 642-648 to exception handling processor core 630.

Each of ASICs or fastpath processor cores 642-648 maintains one or more counters. The counters are defined as a regular data type, for example, unsigned integer, unsigned long long, etc., in lieu of an atomic data type. When an ASIC or fastpath processor core 642-648 receives a packet, it may increment or decrement the values of the counters to reflect network traffic information, including but not limited to, the number of received frames, the number of received bytes, error conditions and/or error counts, etc. A typical pipeline process at ASICs or fastpath processor cores 642-648 includes one or more of: port lookup; VLAN lookup; port-VLAN table lookup; bridge table lookup; firewall session table lookup; route table lookup; packet encapsulation; packet encryption; packet decryption; tunnel de-capsulation; forwarding; etc.

According to embodiments of the present disclosure, network services provided by network device 600, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
   receiving, by a first processor at a network device, a first packet;
   determining whether a user entry corresponding to the first packet exists in a first table, wherein a second table having a missing entry is dependent upon the first table;
   in response to the user entry existing in the first table, creating a session entry in the second table for the first packet based on the user entry;
   in response to the user entry not existing in the first table, creating, by the first processor, an inactive entry in the first table, wherein the inactive entry includes a source Internet Protocol (IP) address associated with the first packet;
   forwarding, by the first processor, the first packet to a second processor for processing;
   receiving, by a processor of a plurality of processors, a second packet;
   determining, by the processor of the plurality of processors, whether a source IP address of the second packet matches the source IP address of the inactive entry; and
   in response to determining that the source IP address of the second packet matches the source IP address of the inactive entry,
   discarding the second packet, wherein the inactive entry is an entry in the first table marked as inactive.

2. The method of claim 1, further comprising:
   associating, by the network device, the inactive entry with a timestamp indicating a time point when the first packet is forwarded to the second processor by the first processor.

3. The method of claim 2, further comprising:
   comparing, by the one of the plurality of processors, a current timestamp with the timestamp associated with the inactive entry in response to receiving the second packet; and
   in response to a difference between the current timestamp and the timestamp associated with the inactive entry being longer than a configured interval (CI),
   associating the inactive entry with the current timestamp; and forwarding the second packet to the first processor for processing.

4. The method of claim 2, further comprising:
determining, by the network device, a configured interval (CI) for each type of a table maintained by the network device to facilitate packet processing.

5. The method of claim 4, wherein the CI is determined based on one or more of a packet type, an amount of time a respective processor takes to processing the first packet, and a relative frequency at which the same type of packets are received.

6. The method of claim 1, wherein the inactive entry is created in the user table and in one or more of a port table, a route table, a virtual local area network (VLAN) table, a route cache, a bridge table, a session policy table, and a station table.

7. The method of claim 1,
wherein the first processor comprises an exception handling processor;
wherein the second processor comprises a control plane processor;
wherein the plurality of processors comprises a plurality of forwarding processors; and
wherein the first processor and the plurality of processors share access to a memory of the network device.

8. The method of claim 1, wherein the inactive entry is created in response to a missing entry in a first table.

9. The method of claim 1, wherein the first table comprises a session table that does not allow for inactive entry.

10. A network device having a symmetric multiprocessing architecture, the network device comprising:
a plurality of CPU cores comprising an exception handling CPU core;
a network interface to receive one or more data packets; and
a memory whose access is shared by the plurality of CPU cores;
wherein the plurality of CPU cores are to:
receive a first packet;
determine whether a user entry corresponding to the first packet exists in a first table, wherein a second table having a missing entry is dependent upon the first table;
in response to the user entry existing in the first table, create a session entry in the second table for the first packet based on the user entry;
in response to the user entry not existing in the first table, create an inactive entry in the first table, wherein the inactive entry includes a source Internet Protocol (IP) address associated with the first packet;
forward the first packet to a second processor for processing;
receive, by a processor of a plurality of processors, a second packet;
determine, by the processor of the plurality of processors, whether the source IP address of the second packet matches the source IP address of the inactive entry; and
in response to a determination that the source IP address of the second packet matches the source IP address of the inactive entry,
discard the second packet, wherein the inactive entry is an entry in the first table marked as inactive.

11. The network device of claim 10, wherein the plurality of CPU cores are further to:
associate the inactive entry with a timestamp indicating a time point when the first packet is forwarded to the second processor by a first processor.

12. The network device of claim 11, wherein the plurality of CPU cores are further to:
compare a current timestamp with the timestamp associated with the inactive entry in response to receiving the second packet; and
in response to a difference between the current timestamp and the timestamp associated with the inactive entry being longer than a configured interval (CI),
associate the inactive entry with the current timestamp; and
forward the second packet to the first processor for processing.

13. The network device of claim 11, wherein the plurality of CPU cores are further to:
determine a configured interval (CI) for each type of a table maintained by the network device to facilitate packet processing.

14. The network device of claim 13, wherein the CI is determined based on one or more of a packet type, an amount of time a respective processor takes to processing the first packet, and a relative frequency at which the same type of packets are received.

15. The network device of claim 10, wherein the inactive entry is created in the user table and in one or more of a port table, a route table, a virtual local area network (VLAN) table, a route cache, a bridge table, a session policy table, and a station table.

16. The network device of claim 10,
wherein the second processor comprises a control plane processor;
wherein the plurality of processors comprises a plurality of forwarding processors; and
wherein the first processor and the plurality of processors share access to the memory of the network device.

17. The network device of claim 10, wherein the inactive entry is created in response to a missing entry in a first table.

18. The network device of claim 10, wherein the first table comprises a session table that does not allow for inactive entry.

* * * * *